United States Patent [19]

Ofer

[11] Patent Number: 5,765,213
[45] Date of Patent: Jun. 9, 1998

[54] METHOD PROVIDING FOR THE FLEXIBLE PREFETCHING OF DATA FROM A DATA STORAGE SYSTEM

[75] Inventor: Erez Ofer, Brookline, Mass.

[73] Assignee: EMC Corporation, Hopkinton, Mass.

[21] Appl. No.: 569,803

[22] Filed: Dec. 8, 1995

[51] Int. Cl.[6] .................................................. G06F 12/00
[52] U.S. Cl. ...................... 711/213; 711/137; 395/383
[58] Field of Search ............................. 395/414, 421.03, 395/464, 383

[56] References Cited

U.S. PATENT DOCUMENTS

| 4,956,803 | 9/1990 | Tayler et al. ................... 395/440 |
| 5,146,578 | 9/1992 | Zangenehpour ................. 395/464 |
| 5,367,656 | 11/1994 | Ryan ............................. 395/421.03 |
| 5,371,870 | 12/1994 | Goodwin et al. ............... 395/872 |
| 5,442,767 | 8/1995 | Eickemeyer et al. ........... 395/401 |
| 5,495,591 | 2/1996 | Ryan ............................. 395/421.03 |
| 5,537,573 | 7/1996 | Ware et al. .................... 395/464 |

*Primary Examiner*—Robert W. Downs
*Assistant Examiner*—Kevin Verbrugge
*Attorney, Agent, or Firm*—Leanne J. Fitzgerald, Esq.; John M. Gunther, Esq.

[57] ABSTRACT

A method of prefetching data from the storage media of a data storage system, in which the data is stored on, and read from, the storage media in individually-accessible data storage portions, such as tracks of a hard disk. A number of immediately past-read data storage portions are used to predict a storage portion or portions that will likely be requested in the future. The unique identifiers of those previously-read data storage portions are determined, and a prediction coefficient is calculated for each unique identifier. The prediction coefficient is then multiplied by the unique identifier, and the results are summed to determine the unique identifier of a data portion to be prefetched.

10 Claims, 4 Drawing Sheets

METHOD PROVIDING FOR THE FLEXIBLE PREFETCHING OF DATA FROM A DATA STORAGE SYSTEM

FIELD OF THE INVENTION

This invention relates to a method of prefetching data from data storage devices in a data storage system in order to speed the data retrieval time.

BACKGROUND OF THE INVENTION

Large computer systems which are coupled to data storage spend a great deal of their CPU and bus time reading and writing data to and from the storage devices. Thus, data retrieval from data storage devices, such as disk drives, optical disks, or CD ROM drives, affects computer system performance and throughput.

Many data storage systems now in use include a cache memory as a buffer for decreasing the amount of time it takes the computer system to read and write data to and from the data storage system. The cache memory transfers data orders of magnitude more quickly than the data storage devices themselves. These systems are designed so that all of the data flowing into and out of the data storage system moves through the cache, so that the relatively large amount of time involved in the data storage device read or write procedure has less impact on the amount of computer system time dedicated to data storage and retrieval.

Data retrieval requests from the computer system to the data storage system are often for a number of sequential data storage portions of the data storage media. Also, many data requests follow predictable patterns, for example data requests which include multiple requests for the same data.

The data transfer speed from the data storage system to the computer system is increased by prefetching data from the data storage media and placing it in the cache memory before the request for the data is actually received by the data storage system. If data which is to be requested is prefetched, and thus resides in cache when the request is received, the data request will not require the retrieval of data from the storage media.

Most data storage systems organize stored data into cylinders, which each have a number of tracks, each of which includes a number of data blocks. For example, a three gigabit hard disk may be organized into 5800 cylinders, each of which has 15 tracks. Each of these tracks may have 64 blocks of data in a Fixed Block Architecture system, each block capable of storing 512 bytes.

One data prefetch scheme in use today for data storage systems organized in this manner determines whether a number of consecutive, past read data blocks are from a single track, and if they are, the system prefetches the entire track under the assumption that soon to follow data requests will be for additional blocks from that track. Another similar scheme keeps track of the ID numbers of the two previous tracks which have been read, and if they are consecutive, it prefetches the next consecutive track, under the assumption that if two consecutive tracks have been read, it is likely that the next consecutive track will also be read.

These prefetch schemes are useful, but their utility is limited. First, they are inflexible, in that they are limited to sequential data requests—in the first case, all the requests used for prefetch prediction must be in the same track, and the second case, the tracks must be consecutive on the storage media. Any past data retrieval actions which are not strictly ordered in the required manner will not result in a successful data prefetch.

SUMMARY OF THE INVENTION

It is therefore an object of this invention to provide a method of prefetching data which is more flexible than other prefetch methods in use.

It is a further object of this invention to provide such a method which can successfully prefetch data regardless of whether the data requests used in making the prefetch prediction are for sequential tracks, or for blocks from a single track.

It is a further object of this invention to provide such a method which can successfully predict future data requests based on non-sequential past requests.

In a general sense, the prefetch prediction method of this invention is a linear prediction, in which prediction coefficients are calculated for the past-read records which are used to make the prefetch prediction. Each coefficient is multiplied by the identification number of the data portion corresponding to that coefficient. The results of the multiplication for each of the data storage portions involved in the prediction are then summed to determine the identification number of the predicted data storage portion to be prefetched from the storage media, and placed in the cache memory. The preferred manner in which this linear prediction is accomplished is by determining a vector of the past-read data portion ID numbers, and calculating the correlation matrix of this vector. This matrix is then inversed and multiplied by the autocorrelation vector of the sample vector in order to get the coefficient vector.

This invention features methods of prefetching data from storage media of a data storage system, in which the data is stored on, and read from, the storage media in individually-accessible data storage portions, each of which has a unique identifier, such as an ID number. One embodiment of the method contemplates determining the unique identifiers of each of a number of previously-read data storage portions, and calculating a prediction coefficient for each of those unique identifiers. The unique identifier of one or more data storage portions are then predicted from the prediction coefficients and the unique identifiers of the previously-read data storage portions. The data storage portion or portions having the predicted unique identifier(s) are then prefetched from the storage media. The prefetch data is stored in cache so that it is available to be read by the host computer system.

The prefetch prediction methods of this invention are appropriate for prefetching blocks and/or tracks of data. One manner in which prefetch is accomplished is to calculate the statistics of the data transfer in a blockwise fashion. This would be accomplished by accumulating the ID numbers of the last N data portions read, and from them calculating reference statistics for the next N data requests, which are then prefetched. A more computationally-intensive, but likely more successful, method contemplates recalculating the prediction multipliers with each new identification number requested by the host. This could be accomplished by calculating coefficients based on a block N of immediately past-read data storage portions; each time a new data storage portion is read, the last member of group N is replaced by the identification number of that just-read data portion.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
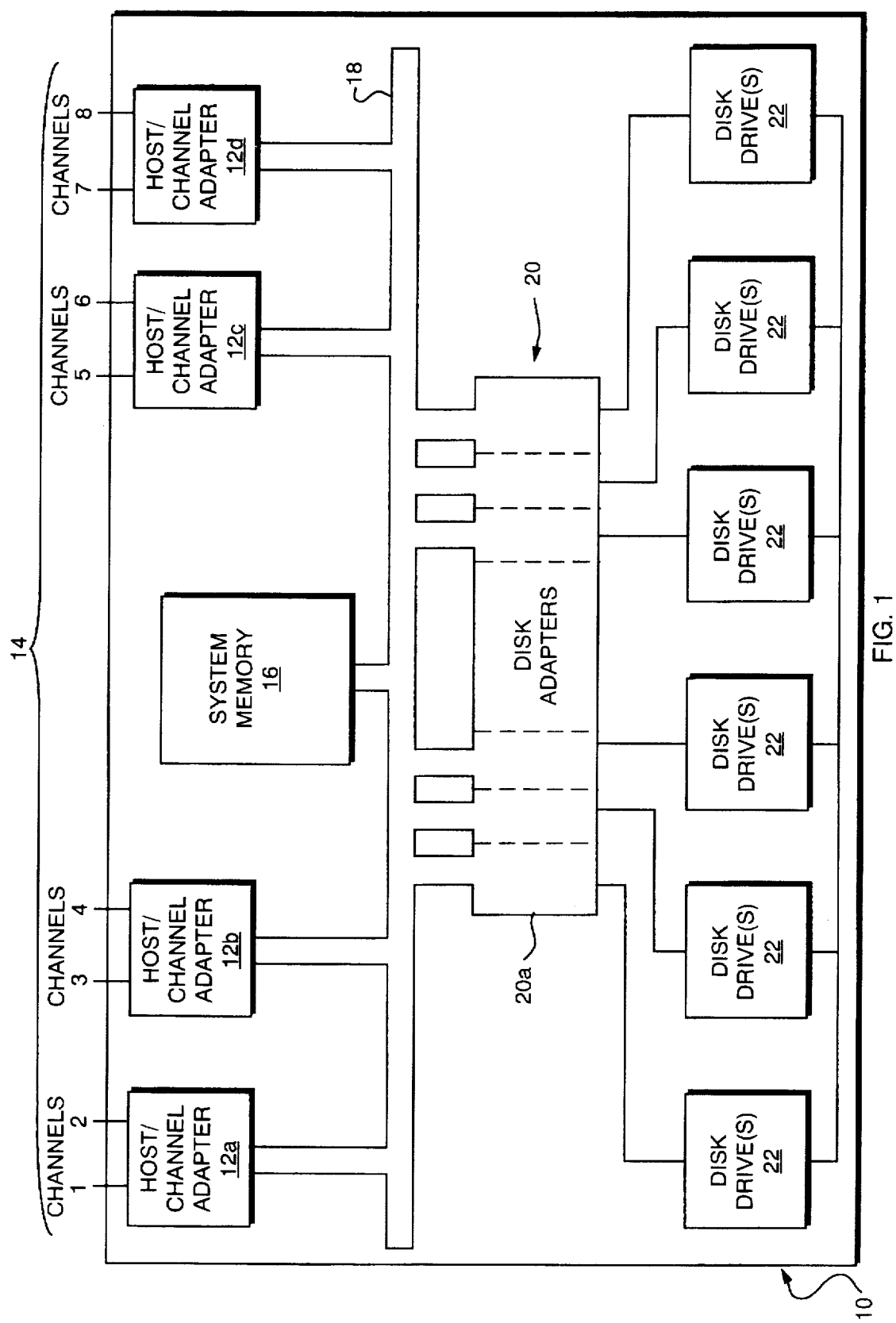
FIG. 1 is a block diagram of a data storage system employing the method of this invention.

There is shown in FIG. 1 disk data storage system 10 which employs the data prefetch methods of this invention. System 10 includes one or more means for receiving read and write commands and data, such as host/channel adapter boards 12a through 12d. These boards are adapted to receive the read/write commands and data over a plurality of communication channels 14, labeled channels 1 through 8, from one or more host computers not shown.

Channel adapter boards 12a through 12d are operatively connected by bus 18 to semiconductor memory storage unit 16. Bus 18 is also operatively connected to one or more disk adapter boards 20, which read and write data to one or more disk drive units 22, each of which includes one or more disk drives.

The operation of system 10, and the manner in which it accomplishes reading and writing of data, is described in more detail in U.S. Pat. No. 5,206,939, incorporated herein by reference.

In one embodiment, data storage devices 22 are disk storage devices, each of which may include one or more disk drives, dependent upon the user's requirements and the system configuration. Additional embodiments contemplate various other types of data storage devices, including, but not limited to, optical disks, CD ROMs, and magnetic tape devices.

In order to decrease the host computer system overhead associated with reading and writing data to and from data storage system 10, storage system 10 is enabled to use a portion of system memory 16 as a temporary or cache memory, for buffering data moving into and out of system 10. System 10 includes a cache manager, which is a virtual entity which may reside on any one or more of disk adapters 20, host/channel adapters 12a through 12d, and/or memory 16. The cache manager does not wait for the disk adapters to read or write data directly to or from the appropriate data storage device, but rather, data to be written to or read from the data storage device is stored in temporary cache memory 23, FIG. 2, which forms part of system memory 16a. In the preferred embodiment, cache memory 23 includes high speed semiconductor memory whose data is rapidly accessible to both host/channel adapters 12a through 12d, and disk adapters 20.

In addition to storing data, system memory 16a in the preferred embodiment also includes an associated cache index/directory 25, which serves to provide an indication of the data which is stored in cache memory 23, and the address of that data. In the preferred embodiment, the cache index/directory 25 is maintained current by a cache manager, and is located in system memory 16a.

Figure 3:
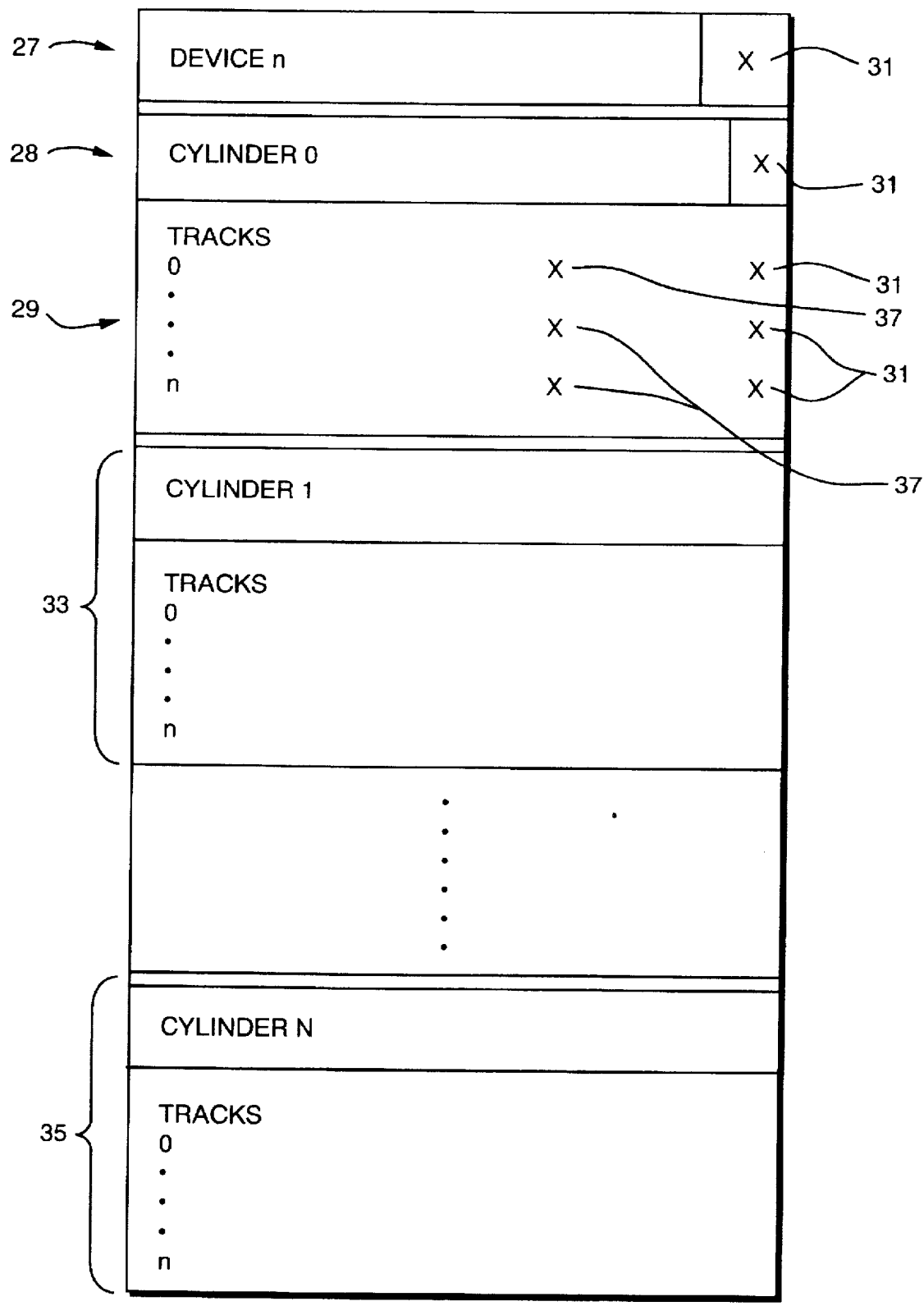
FIG. 3 is a schematic illustration of a data storage device cache index/directory table resident in the memory of FIG. 2.

The cache index/directory is preferably organized on a device by device basis, with one table such as table 25, FIG. 3, for each data storage device. Each device table is organized by device data storage portions, which are termed cylinders and tracks, and possibly blocks. Disk drive device cache index/directory table 25 includes device header 27, which identifies the device. Table 25 is then organized so that each cylinder O through N is provided a table portion, within which each of the tracks O through n are organized. For example, cylinder O header 28 is followed by cylinder O track information indicated generally at 29. Cylinders 1 through N follow with associated disk drive track information 33 and 35, respectively.

Each of the device, cylinder and track entries also includes at least a first associated bit position 31, which if set, indicates that the corresponding track, cylinder or device is stored in the cache. Also included with each of the track entries may be a second bit position 37, which is reset once the prefetched track has been used by the host. If it is desirable to prefetch blocks, the table would also include a bit position for each block of each track. This type of device by device cache index/directory is also described in detail in applicant's U.S. patent application Ser. Nos. 07/586,254, and 07/586,796, both of which are incorporated herein by reference.

Figure 2:
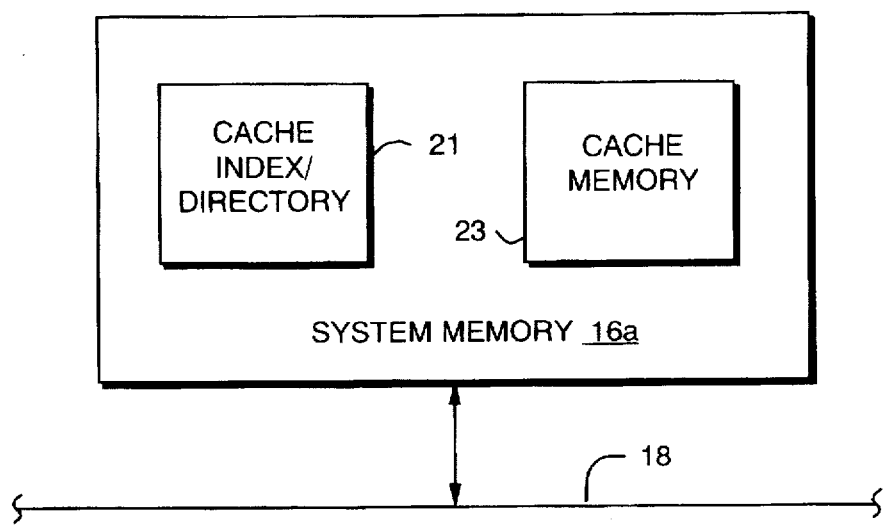
FIG. 2 is a more detailed block diagram of the system memory of FIG. 1.

System memory 16a, FIG. 2, is enabled to include such a cache index/directory table for each data storage device of the data storage system. All the tables are resident in directory 21, FIG. 2. Each cache index/directory table establishes a hierarchy of data storage portion indices which a cache manager can search to inquire, device by device, and data storage element by data storage element, whether any records from the device are stored in cache.

Figure 4:
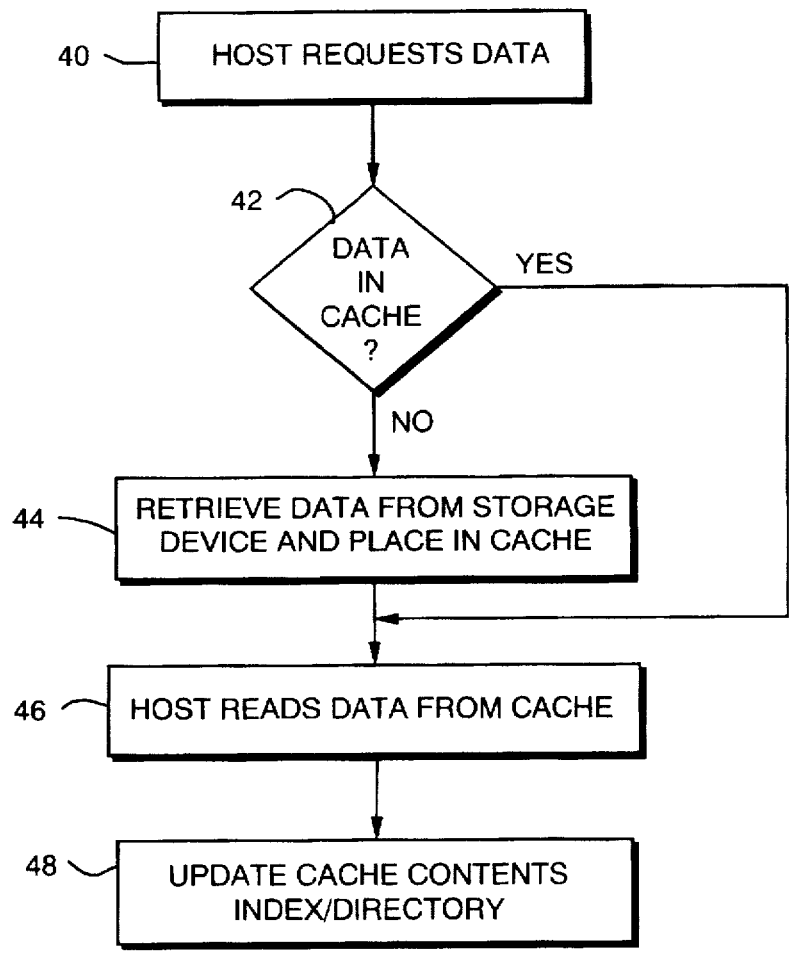
FIG. 4 is a flow chart illustrating data access by a host computer coupled to a data storage system incorporating the data prefetch method of this invention.

FIG. 4 details a flow chart of the basic method by which a host computer accesses data stored in data storage system 10, FIG. 1. When data is requested by the host computer, step 40, FIG. 4, the host/channel adapter 12a through 12d determines, through the appropriate cache index/directory, whether the requested data is in cache memory, step 42. If the requested data is in the cache, the host reads the data from the cache, step 46.

If the data is not in the cache, the host/channel adapter instructs the appropriate disk adapter 20a to retrieve the requested data from the correct data storage device. The retrieved data is then stored in cache memory, step 44. This data would then be read from the cache by the host, step 46. After the data is read by the host, the cache contents index/directory is updated to reflect the data which is currently in the cache, step 48.

In the data prefetch prediction methods of this invention, the prediction is based on a number of past-read data portions, typically either tracks or blocks. A separate dedicated table is used to hold the past-read portions of data.

Figure 5:
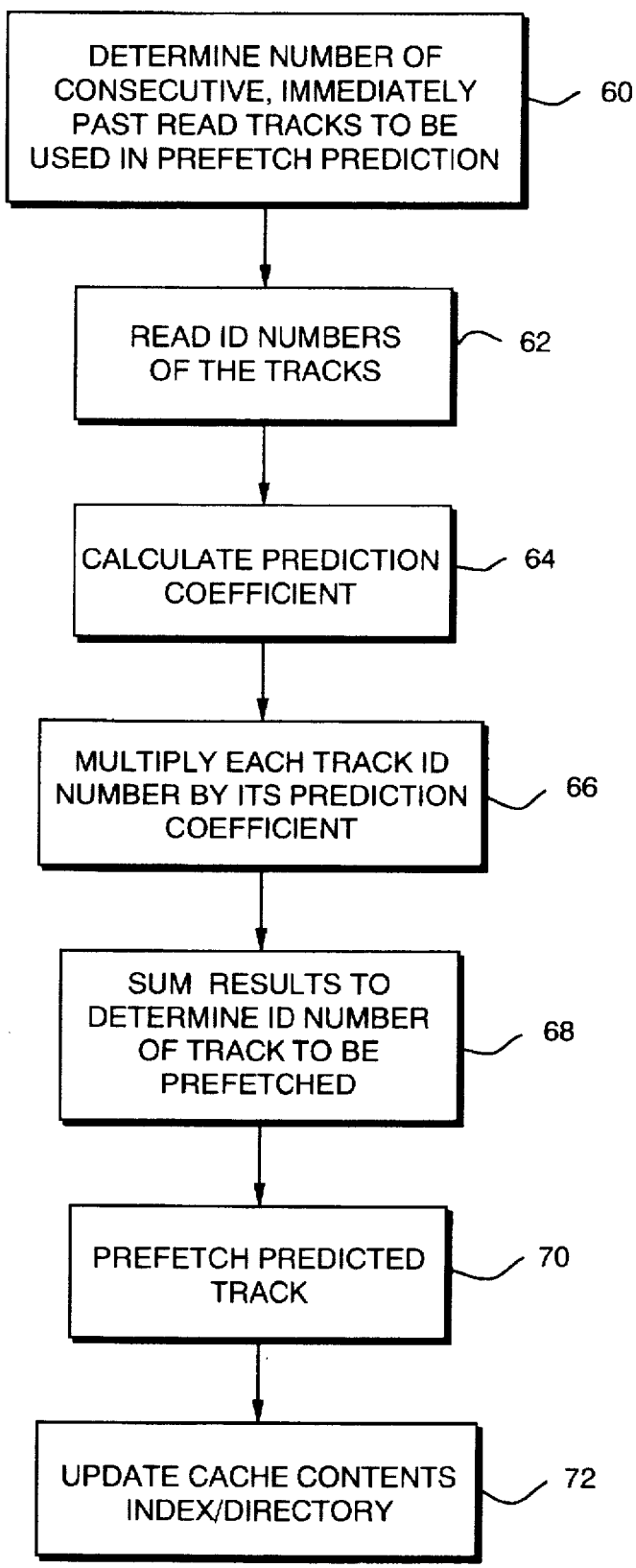
FIG. 5 is a flow chart illustrating a preferred embodiment of the data prefetch method of this invention.

The data prefetch method of FIG. 5 begins by the determination of the number of consecutive, immediately past-read data storage portions to be used in the prefetch prediction, step 60. This flow chart assumes that the data storage portions which are read, and used to predict the data storage portion(s) to be prefetched, are data tracks, although that is not a necessary limitation of this invention. As described above, any individually-accessible data storage portion of a data storage system may be prefetched by the methods of this invention.

The determination of step 60 would likely be based upon a fixed number of immediately consecutively past read data storage portions, for example the last 256 tracks which have been requested from the data storage system by the host. The identification numbers of those tracks is then determined, step 62. A prediction coefficient is then calculated for each of those tracks, step 64. The manner in which the prediction coefficients are calculated is further described below. Each track identification number is then multiplied by its prediction coefficient, step 66, and those results are summed to determine the ID number of a track to be prefetched, step 68. That track is then prefetched from the disk on which it resides, and placed in the cache, step 70, and the cache contents index/directory is updated, step 72.

The predictions performed according to this invention are linear, in that the ID number of each data storage portion which is used in making the prediction is multiplied by a calculated prediction coefficient, and those results are summed. Each time the predictor is activated, it will generate a prediction for the next block or track needed, or a number of blocks or tracks.

The linear prediction scheme can be represented by the following equation 1:

$$\hat{S}(n) = \sum_{k=1}^{p} a_k S(n-k) \quad (1)$$

which $\hat{S}(n)$ is the predicted ID number of the block or track to be prefetched, needed in the instance of time designated as n. $a_k$ (k=1 ... p) are the prediction coefficients.

Since the blocks or tracks actually requested to be read from the data storage system will not fit the above equation model perfectly, it is possible to define an error between $S(n)$, which is the true portion (track or block) requested, and $\hat{S}(n)$ which is the value predicted. If E(n) is defined as this error, then the following holds true:

$$E(n) = S(n) - \hat{S}(n) = S(n) - \sum_{k=1}^{n} a_k S(n-k) \quad (2)$$

The prediction coefficient should be chosen so as to minimize the mean square prediction error averaged over all n.

The expression for the mean square error can be put into the form:

$$(E(n)^2) = \sum_{n=1}^{\infty} \left[ S(n) - \sum_{k=1}^{n} a_k S(n-k) \right]^2 \quad (3)$$

To solve for the prediction coefficients, this last equation (3) is differentiated with respect to $a_j$, j=1, 2, . . . , p, and the result is set to 0, giving the set of p equations:

$$\sum_{k=1}^{p} a_k \sum_{n=1}^{\infty} S(n-k)S(n-j) = \sum_{n=1}^{\infty} S(n)S(n-j) \quad (4)$$

In matrix formulation, the set of equations 4 can be written as:

$$\Phi\alpha = \Psi \quad (5)$$

In which each element of $\Phi$ is defined as:

$$\Phi_{ij} = \sum_{n=1}^{\infty} S(n-i)S(n-j) \quad (6)$$

and, each element of $\Psi$ may be defined as follows:

$$\Psi_j = \Phi_{oj} \quad (7)$$

Accordingly, $\Phi$ is a matrix of autocorrelations, and $\Psi$ is a vector of autocorrelations. Since $\Phi$ is symmetric and positive definite, there exist several well known mathematical tools for solving the set of equations. One example for solving this set of equations is Levinson's Algorithm (See: Probability, Random Variables, and Stochastic Processes, Althanasios Papoulis, McGrawHill 1985, 2nd edition, pp. 430).

By feeding the predicted identifier back into the predictor, an additional predicted identifier could be calculated. By repeating this process several times, more than one data portion (track or block) could be predicted.

Many modifications of the presently disclosed invention will become apparent to those skilled in the art with the benefit of the foregoing description.

What is claimed is:

1. A method of prefetching data from storage media of a data storage system, in which data is stored on, and read from, the storage media in individually-accessible data storage portions, each said data storage portion having a unique identifier, the method including the steps of:

designating a number of previously - read data storage portions as the data storage portions upon which a data storage portion prefetch prediction will be based;

determining the unique identifiers of each of the designated data storage portions;

calculating a prediction coefficient for each determined unique identifier;

predicting the unique identifier of at least one data storage portion, by multiplying the unique identifier of each of the designated data storage portions by the prediction coefficient for each determined unique identifier and summing the results for all the unique identifiers to determine the unique identifier for the at least one data storage portion; and prefetching from the storage media the at least one data storage portion having the predicted unique identifier.

2. The data prefetch method of claim 1 in which the step of designating a number of previously-read data storage portions includes selecting a plurality of consecutive, immediately past-read data storage portions as the designated data storage portions.

3. The data prefetch method of claim 2 in which the step of predicting the unique identifier of each of at least one data storage portion includes ascertaining the unique identifiers of a number of separate data storage portions.

4. The data prefetch method of claim 3 in which the step of prefetching the at least one data storage portion includes prefetching the number of separate data storage portions having the unique identifiers which have been resolved.

5. The data prefetch method of claim 4 wherein the data storage system includes a cache memory, the method further including the step of placing the number of separate data storage portions in the cache memory.

6. The data prefetch method of claim 5 in which the step of prefetching the at least one data storage portion further includes reading the number of data storage portions from the storage media in a particular order.

7. The data prefetch method of claim 6 in which the step of placing the number of separate data storage portions in the cache memory includes ordering the number of separate data storage portions in the cache memory in the same particular order in which the number of separate data storage portions were read from the storage media.

8. The data prefetch method of claim 3 in which the step of selecting a plurality of consecutive, immediately past-read data storage portions as the designated data storage portions includes selecting n immediately past-read data storage portions.

9. The data prefetch method of claim 8 in which the step of ascertaining the unique identifier of a number of separate data storage portions includes ascertaining the unique identifiers of n separate data storage portions.

10. A method of prefetching data from storage media in a data storage system, in which the data is stored on, and read from, the storage media in individually-accessible data storage portions, each having a unique identifier, the method including the steps of:

- selecting a number of previously-read data storage portions;
- labeling the data storage portions, with the label k, in the order in which the data storage portions were read, from k=1 to k=p;
- determining the unique identifier, S(n−k),of each of the p data storage portions;
- calculating a prediction coefficient $a_k$ for each of the p data storage portions; and
- predicting the unique identifier, S(n), of the next data storage portion to be read, according to the formula:

$$\hat{S}(n) = \sum_{K=1}^{P} A_K S(n-k).$$

* * * * *